July 25, 1950 M. S. WONG 2,516,169
RESONANCE AND STANDING-WAVE IMPEDANCE MEASURING LINE
Filed Dec. 10, 1947 3 Sheets-Sheet 3
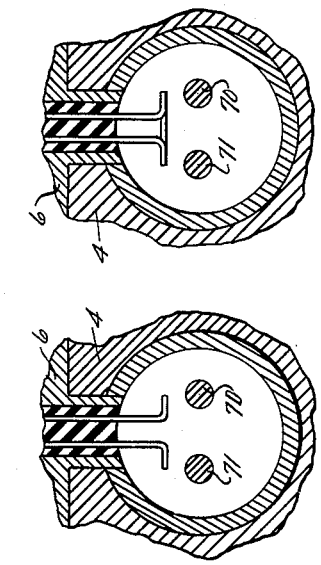
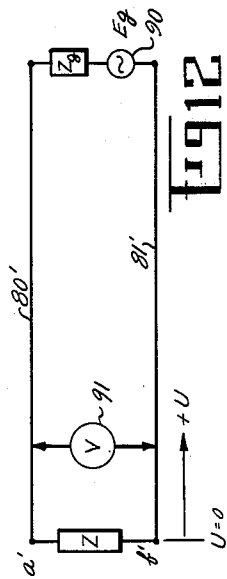
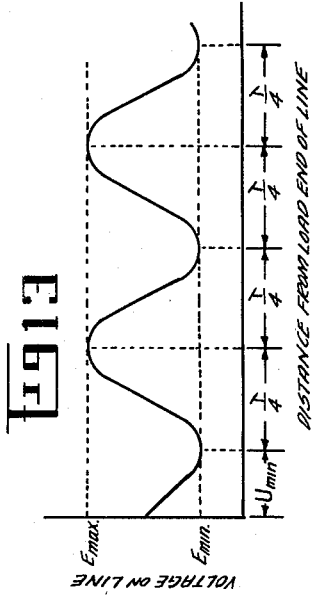
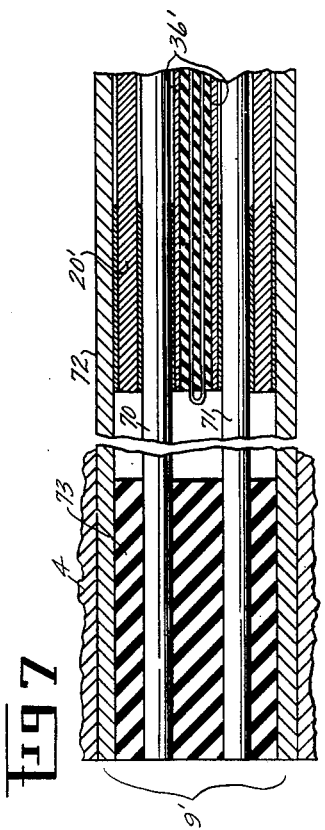
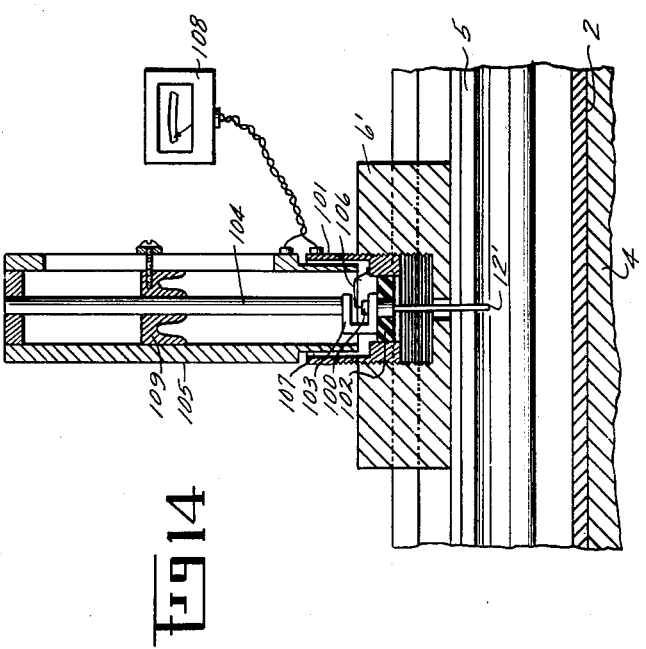
INVENTOR.
MING S. WONG
BY Wade Konty
ATTORNEY
James S. Shannon
AGENT Patented July 25, 1950

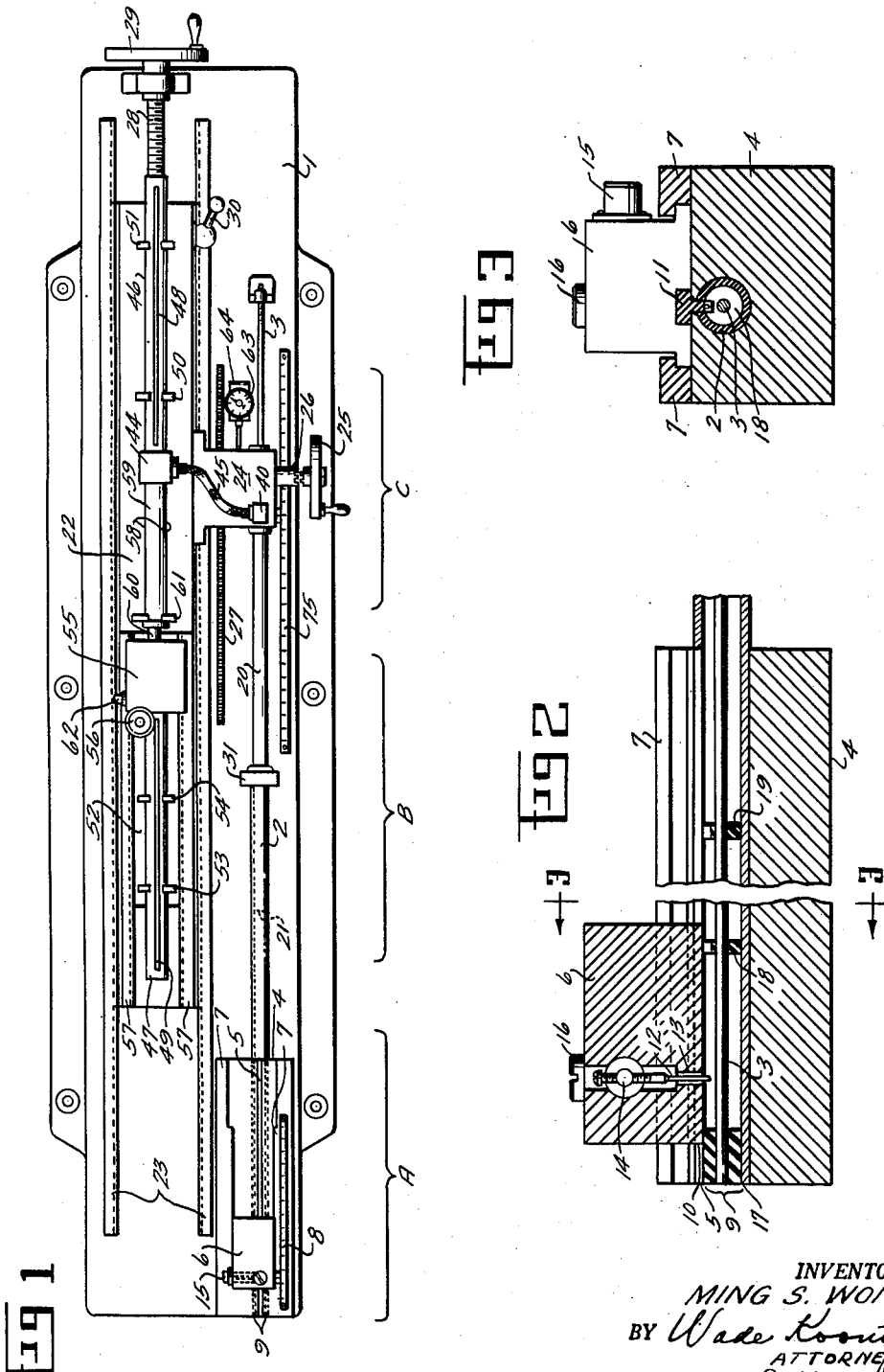

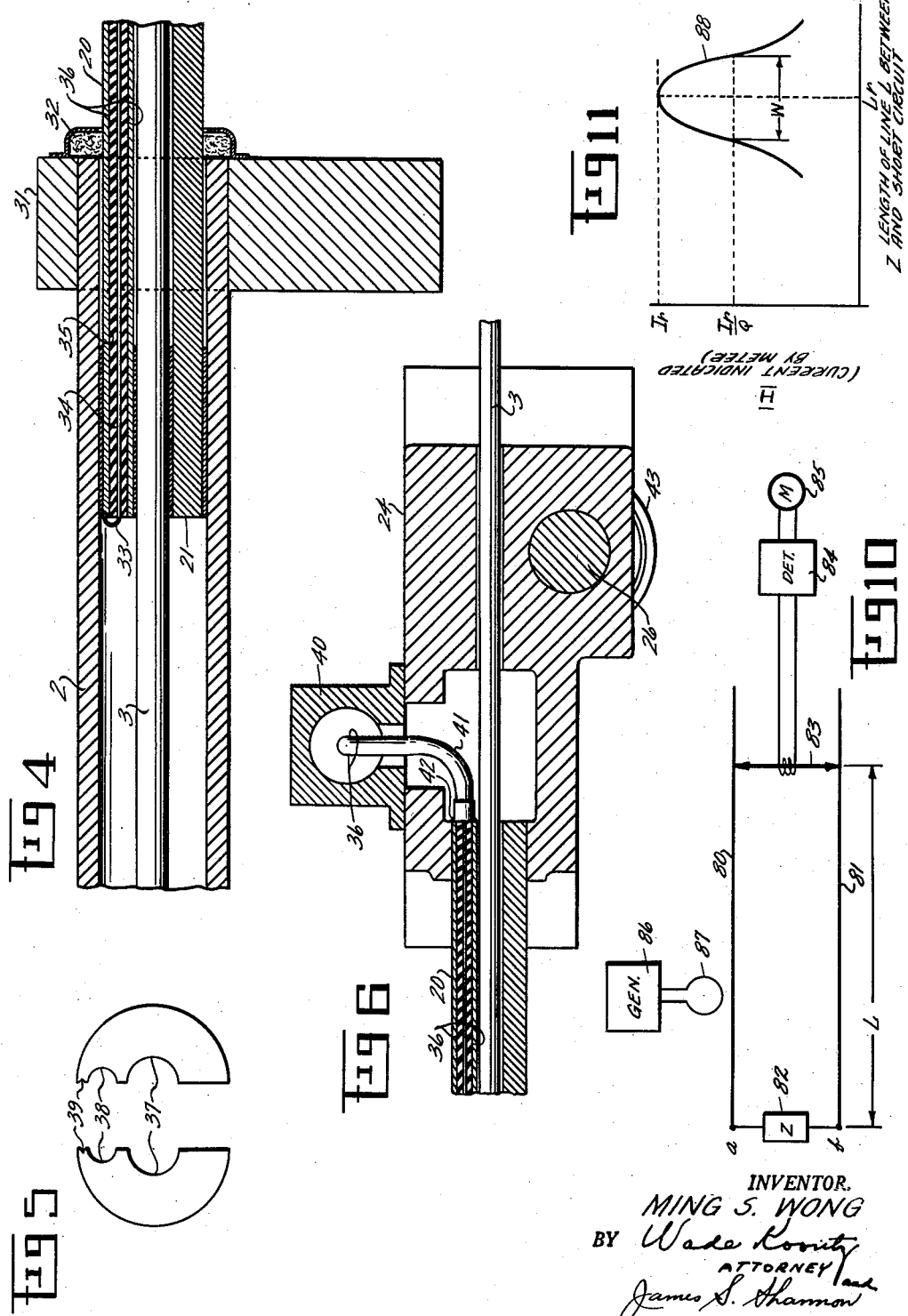

2,516,169

UNITED STATES PATENT OFFICE 2,516,169

RESONANCE AND STANDING-WAVE IMPEDANCE MEASURING LINE

Ming S. Wong, Dayton, Ohio

Application December 10, 1947, Serial No. 790,751

2 Claims. (Cl. 175—183)

(Granted under the act of March 3, 1883, as amended April 30, 1928; 370 O. G. 757)

The invention described herein may be manufactured and used by or for the Government for governmental purposes without payment to me of any royalty thereon.

This invention relates to the measurement of impedances at high frequencies of the order of 300 to 5000 megacycles per second and particularly to those methods of impedance measurement that involve connecting the impedance to be measured to a transmission line and making measurements on the line which may be used to calculate the value of the impedance.

It is the object of the invention to provide an apparatus for measuring a wide range of impedances with a high degree of accuracy.

More specifically it is the object of the invention to provide a high frequency transmission line that is particularly suited to the measurement of impedances by the resonant-current method, but that also may be used to measure impedances by the standing-wave method.

The impedance measuring line to be described is particularly adapted to the measurement of antenna impedances but may be used equally well to measure the impedance of any element or network at high frequencies.

Specific embodiments of the invention are shown in the drawings in which:

Fig. 1 is a plan view of the complete impedance measuring line,

Fig. 2 shows a cross-sectional elevation of that part of the line designated by bracket A in Fig. 1 to an enlarged scale, Fig. 3 is a cross-section taken perpendicular to the axis of the line in the section designated by bracket A in Fig. 1 at an enlarged scale, Fig. 4 is a cross-sectional elevation of that part of the line designated by bracket B in Fig. 1 at an enlarged scale.

Fig. 5 illustrates a method of fabricating the short circuiting plunger,

Fig. 6 is a cross-sectional elevation of that part of the line included in bracket C of Fig. 1 at an enlarged scale, Figs. 7, 8 and 9 show modifications to permit the use of a transmission line of the two conductor shielded type.

Fig. 10 is an equivalent circuit of the impedance measuring line when operated in accordance with the resonant-current method.

Fig. 11 illustrates the measurements to be made on the line in the resonant-current method.

Fig. 12 shows the equivalent circuit of the impedance measuring line when operated in accordance with the standing-wave method.

Fig. 13 illustrates the measurements to be made on the line in using the standing-wave method of impedance measurement.

Fig. 14 shows a suitable voltage indicating device for use with the impedance measuring line when operated in accordance with the standing-wave method.

In the plan view of the complete impedance measuring line shown in Fig. 1, I represents a rigid base of cast metal having a flat machined upper surface upon which the various elements of the line are mounted. The transmission line 2 consists of an outer conductor in the form of a tube made of a highly conductive material such as brass and an inner conductor mounted concentrically with the outer conductor. The extension of the center conductor may be seen to the right at 3. That part of the inner conductor located within the outer conductor is also made of a highly conductive material such as brass and, if desired, the inner surface of the outer conductor and the outer surface of the inner conductor may be plated with silver in order to further increase the conductivity and reduce losses.

About one-half of the outer conductor of transmission line 2 is pressed into a metallic block 4 which is fixedly mounted on base 1 and serves to support one end of transmission line 2. That part of the transmission line inside block 4 is slotted, as is also the upper surface of block 4 as shown at 5, to permit a probe to be inserted into the space between the outer and inner conductors of the transmission line. The probe is carried by metallic block 6 which is arranged to slide along the upper surface of block 4 on which it is guided and held in place by gibs 7. A scale 8 is provided to indicate the distance of the probe from the end 9 of the transmission line 2. Further details of blocks 4 and 6 are shown in Figs. 2 and 3.

Referring to Fig. 2 the block 6 is provided with a tongue 10 which fits the slot 5 and extends downward so that its lower surface is flush with the inner surface of the outer conductor of the transmission line, thus preserving the inner contour of the line under block 6. In order to preserve the inner contour of the line throughout the length of block 4 various lengths of metallic covering strips 11, having 2 cross sections as shown in Fig. 3, are provided for filling the slot 5 on either side of block 6 once the position of block 6 for a particular measurement has been determined. Probe 12 having reduced lower portion and a threaded upper portion is positioned in hole 13 by threading the upper portion into the conductor 14 which extends horizontally across the block 6 to the plug fitting 15 (Fig. 3). With this arrangement the probe may be adjusted up or down to regulate the degree of coupling to the transmission line. Cover screw 16 is provided to permit adjustment of the probe and to maintain complete shielding. The center conductor 3 is supported at the end 9 of the transmission line by insulator 17 which may be made of any suitable material having low loss at high frequencies such as polystyrene. Additional discs of low loss insulating material such as 18 and 19 may be provided for supporting the center conductor if necessary. These discs are slotted at the top to permit passage of probe 12. The other end of transmission line 2 is rigidly held by support 31 which is fixed to base 1.

Referring again to Fig. 1 a metallic plunger 20 is provided that fits into the end of transmission line 2 and serves to short circuit the transmission line at the inner face 21 of the plunger. The plunger has a hole lengthwise thereof at its center to permit passage of the extended inner conductor 3 of the transmission line. Movement of plunger 20 serves to change the electrical length of the transmission line 2. In order to arrange for moving the plunger 20, and also for moving therewith all associated electrical apparatus which should have a fixed position relative to the plunger, the travelling base 22 is provided. This base is a rigid metallic casting and is arranged to slide on the upper surface of base 1, being guided and held in place thereon by gibs 23. An extension 24, which is also a metallic casting, is fixed to the side of travelling base 22 and moves therewith. The outer end of plunger 20 is tightly pressed into a hole in the extension casting 24 which supports this end of the plunger and serves to move the plunger into or out of transmission line 2 as the base 22 is moved. The extension 24 carries a hand wheel 25 which may be pushed in to engage shaft 26 on which is mounted a pinion (not shown) that engages rack 27 for rapid movement of the plunger 20 and travelling assembly 22—24. In order to provide for a fine adjustment of the position of plunger 20 a lead screw 28 driven by hand wheel 29 is provided. To use the fine adjustment the arm 30 mounted on base 22 is rotated to cause a cam actuated half nut (not shown) to engage the lead screw 28. Rotation of the lead screw then acts to move the travelling base 22 and, as a result, the plunger 20. The scale 75 serves to indicate the length of line between end 9 and the face 21 of plunger 20.

The details of plunger 20 and the plunger end of transmission line 2 are shown in Fig. 4. The plunger 20, except near the short-circuiting end, has an outside diameter slightly less than the inside diameter of the outer conductor of transmission line 2, and the diameter of the hole through the center of the plunger is made slightly greater than the diameter of the center conductor 3, in order to allow free movement of the plunger within the transmission line. However, for some distance back from the short-circuiting end 21 of the plunger a heavy plating of a hard metal such as hard chromium is applied to the outer surface of the plunger and the inner surface of the hole through the center of the plunger. The plated end of the plunger is then carefully machined and polished to have a very accurate and close fit with the inner surface of the outer conductor and the outer surface of the center conductor of the transmission line. This arrangement provides a very effective shore-circuit between the conductors of the transmission line and due to the fact that contact is made between the soft metal of the line conductors and the hard metal on the plunger the wear is very slight and the effectiveness of the short circuit is maintained throughout a long period of use. This type of short circuiting means is found to maintain its uniformity over a longer period of time than the usual spring finger type and also the point on the line at which short circuiting occurs is more sharply defined and coincides very nearly with the plane face 21 of the plunger. A felt seal 32 is provided at the open end of the transmission line to prevent dirt being carried into the line by the plunger.

A small coupling loop 33 is positioned on the surface 21 of the plunger to provide means for taking energy from or supplying energy to the transmission line depending upon the way in which the line is used to measure impedances as will be explained later. Connected with this loop is a concentric transmission line 36 having an inner conductor 34 and an outer conductor formed by the inner surface of a longitudinal cylindrical hole in the metallic plunger. The center conductor 34 is positioned in the hole by suitable insulating material 35 having low loss at high frequencies.

The plunger 20 may be fabricated by first machining semicircular channels 37 and 38 and a receptacle 39 for one end of loop 33 in two pieces of metal as shown in Fig. 5. The two pieces of metal may then be welded or sweated together and turned to the proper size.

Fig. 6 shows a cross section of extension 24 taken along a vertical plane through the center of plunger 20. Transmission line 36 after leaving the plunger 20, passes upward through casting 24 into housing 40. This part of transmission line 36 is provided with an outer metal shield 41, which serves as the outer conductor, a function performed by the body of the plunger for that part of the line within the plunger. The shield 41 is electrically connected to the plunger at 42 and its inside diameter should equal the diameter of the transmission line passageway in the plunger so that the line is uniform throughout its length. The shaft 26 in casting 24 carries pinion 43 which engages rack 27 (Fig. 1) for rapid movement of the plunger as previously explained.

Referring again to Fig. 1 the transmission line 36 passes from housing 40 through flexible outer shield 45 into housing 44 which is rigidly mounted on travelling base 22. Elements 46 and 47 are concentric short circuited stub lines having slots 48 and 49 through which a sharp pointed instrument may be inserted to move an adjustable short circuiting means (not shown) for varying the lengths of the lines. The slots 48 and 49 may be closed after adjustment if desired by the use of covers of the type shown at 11 in Fig. 3. Stub line 46 is rigidly mounted on travelling base 22 by supports 50 and 51 and has its input end located in housing 44. Stub line 47 is rigidly mounted on a travelling plate 52 by supports 53 and 54 and has its input end located inside housing 55 which is also fixed to plate 52. Hand wheel 56 is mounted on plate 52 and drives a pinion which engages a rack on travelling base 22 below plate 52 (not shown) so that by rotating wheel 56 plate 52, which carries line 47 and housing 55, may be moved relative to travelling base 22. Gibs 57 serve to guide and hold plate 52 in place on base 22.

An adjustable length of concentric transmission line 58 is situated between housing 44 and housing 55. This line consists of a larger section 59 rigidly mounted on base 22 by support 61 and housing 44 and slidable over smaller section 60 which is fixed to housing 55 and therefore moves with plate 52. Both the outer and inner conductors of section 59 fit over the outer and inner conductors respectively of section 60 so that two telescoping sections are formed. By rotating wheel 56 section 60 moves into or out of section 59 thus varying the total length of composite line 58. Variable length lines of this type are well known in the art and are sometimes referred to as "line stretchers."

The housing 55 contains a suitable detector for high frequencies such as a crystal detector. Inside housing 55 the detector, the input end of transmission line 47 and one end of adjustable transmission line 58 are connected in parallel. Inside housing 44 the other end of adjustable line 58, the input end of line 46 and the end of transmission line 36 are connected in parallel. The stub lines 46 and 47 and adjustable line 58 form an impedance matching network and by proper adjustment of these elements the impedance appearing at the end of transmission line 36 may be matched to the impedance of the detector over a wide range of values for these two impedances. This type of impedance matching network and also the structural details of its component elements are well known in the art and a more detailed description thereof than that given above is not considered necessary. The direct current or audio frequency output of the detector may be taken from plug fitting 62 and applied to any suitable type of direct current or audio frequency indicating device.

An important feature of the impedance measuring line is that no relative motion of any high frequency circuits located between loop 33 (Fig. 4) and the detector is caused by movement of plunger 20. This is accomplished by mounting all high frequency circuits, namely, transmission line 36, impedance matching network 46—47—58 and the detector, on a unitary structure which moves with plunger 20. If such an arrangement is not provided it is necessary to use flexible high frequency transmission lines and it has been found that movement of such lines causes sufficient detuning to give inaccurate or erratic results.

In making impedance measurements by the resonant current method it is necessary to be able to measure small movements of plunger 20 with a high degree of accuracy. This is accomplished by using a high multiplication gage 63 mounted on a metallic block 64 which rests on the surface of base 1. In order to measure a small movement of plunger 20 the contact point of gage 63 is placed against extension 24 in the direction of motion and the gage zeroed or its reading noted. After the plunger has been moved the distance will be indicated by the gage either directly or as the difference of two readings. The block 64 must have sufficient weight to remain stationary on the surface of base 1.

It is not essential that the transmission line 2 be of the concentric type as in the embodiment that has been described. Other types of shielded high frequency lines may be used. For example, Figs. 7, 8 and 9 show a two conductor shielded transmission line suitable for use as an impedance measuring line. Referring to Fig. 7, which is a section taken on a horizontal plane through the center of the line, there are shown the end 9' of the line and the plunger end. The line is composed of two conductors 70 and 71 and a cylindrical shield 72. The conductors 70 and 71 are supported at the end 9' by insulator 73 and the impedance to be measured is connected between conductors 70 and 71 at this end. The plunger 20' is similar to plunger 20 of Fig. 4 except that two passageways are provided for conductors 70 and 71 and the passageway for transmission line 36' is located at the center of the plunger. The transmission line 36' is also of the two conductor type as shown. The end of plunger 20' is plated on the outside and also on the inside of the passageways for conductors 70 and 71 with a hard metal which is machined and polished to give a very close and accurate fit between the inside of the shield and the end portion of the plunger and between the outside of conductors 70 and 71 and the inside of their passageways at the end of the plunger. This construction is the same as described in connection with Fig. 4 and provides a good short circuit between conductors 70 and 71 and between each of these conductors and the shield. As in the case of transmission line 2 the shield and two conductors are made of highly conductive material such as brass which may be plated with silver if desired to further reduce losses.

The coupling probe carried by block 6 (Figs. 1 and 2) may, in the case of the two conductor lines, be of the form shown in Fig. 8. Or the coupling may be accomplished by a small horizontal loop as shown in Fig. 9.

Before describing the manner of using the impedance measuring line the theory underlying the measurement of impedances by the resonant-current and standing-wave methods will be briefly discussed. In the resonant-current method the impedance measuring line may be represented schematically as in Fig. 10. In this figure 80 and 81 are the two conductors of an impedance measuring line across the end $a, b$ of which the impedance to be measured 82 is connected. The line is also provided with an adjustable short circuiting means 83. The detector 84 and meter 85 are loosely coupled to the short circuited end of the line so that the reading of meter 85 is proportional to the current in the line at this end. The line is excited by generator 86 which is loosely coupled to the line by any suitable means such as loop 87. The coupling between the generator and the line should be the minimum required to give usable readings on the meter 85. If the short-circuiting means 83 in Fig. 10 is moved along the line to vary its length L the current indicated by meter 85 will pass through a number of maxima one of which is as shown by the curve 88 in Fig. 11. If a constant excitation is applied to the line by generator 86 and if the line losses are very low the curve 88 will be symmetrical about the resonant length of line Lr as shown. Also the distance between successive maxima will be one-half the wavelength of the energy flowing in the transmission line.

From measurements made on the system shown in Fig. 10 the value of the impedance 82 may be determined from the following equations:

(1) $$Z = Z_0 \frac{1-k}{1+k}$$

(2) $$|K|\,|kd| = \frac{Q^2 - \cos\frac{2\pi w}{\lambda}}{Q^2 - 1} - \sqrt{\left(\frac{Q^2 - \cos\frac{2\pi w}{\lambda}}{Q^2 - 1}\right)^2 - 1}$$

(3) $$\theta + \theta_d = \frac{4\pi}{\lambda} L_r \pm 2n\pi \quad (n = 0, 1, 2, 3, \ldots)$$

in which:

$Z$ = impedance to be measured.
$Z_0$ = characteristic impedance of the impedance measuring line.
$k$ = complex reflection coefficient associated with the impedance $Z$.
$k_d$ = complex reflection coefficient associated with the detector end of the line.
$Q$ = an arbitrary real number greater than unity.
$w$ = width of resonance-current curve 88 between points on opposite sides at which $$|I| = \frac{I_r}{Q}$$

(see Fig. 11)
$\lambda$ = wavelength of exciting high frequency energy in the transmission line.
$\theta$ = phase angle of $k$.
$\theta_d$ = phase angle of $k_d$.
$L_r$ = length of line at which $|I|$ is maximum (see Fig. 11).

In using the above equations it is first necessary to determine the value of $|k_d|$ and $\theta_d$ in equations 2 and 3. The coefficient $k_d$ has a magnitude different from unity since the element 83 does not produce a perfect short circuit due principally to the effect of the detector coupling at this end of the line. The value of $|k_d|$ may be determine by replacing Z between points $a$, $b$ in Fig. 10 with a short circuit and adjusting L to determine $L_r$ and $w$ for a selected value of $Q$ and to determine $\lambda$ which is twice the distance between successive maxima. For the short circuited condition $k = 1$ and $|k| = 1$ since $$k = \frac{Z_0 - Z'}{Z_0 + Z'}$$

$$|k| = \frac{Z_0 - Z'}{Z_0 + Z'}$$

and $Z'$, which is the impedance between points, $a$, $b$, is zero for a short circuit. Therefore by substituting the measured values of $w$, $\lambda$ and $|k| = 1$ in Equation 2 the value of $|k_d|$ may be determined, and by substituting the measured value of $L_r$ and $\lambda$ in Equation 3 $\theta_d$ may be determined since the phase angle $\theta$ of $k$ for a short circuit is 0. The short circuit may then be replaced by the impedance to be measured Z at points, $a$, $b$, and L again adjusted to determine the values of $L_r$ and $w$ for this condition. Substituting this value of $w$ together with the above determined value of $|k_d|$ in Equation 2 allows this equation to be solved for $|k|$. Also substituting the value of $L_r$ together with the above determined value of $\theta_d$ in Equation 3 gives the phase angle $\theta$. The complex reflection coefficient associated with Z is now determined and is $$k = |k|/\theta = |k|\cos\theta + j|k|\sin\theta$$

By substituting the above value of $k$ and the value of $Z_0$ in Equation 1 the value of Z may be determined. It is not necessary to recompute $|k_d|$ and $\theta_d$ for each measurement since these factors do not change so long as the electrical properties of the measuring line and its associated detector, and the frequency at which measurements are being made remain unchanged.

In using the line shown in Fig. 1 to make measurements by the resonant-current method a signal generator is connected to terminal 15 and a direct current or audio frequency indicator or meter is connected to terminal 62. The signal generator and the probe 12 carried by block 6 (Fig. 2) correspond to signal generator 86 and loop 87 of Fig. 10. The meter connected to terminal 62, the detector contained in housing 55, the impedance matching device and transmission line 36 (Fig. 4), and loop 33 correspond to the meter 85, detector 84 and the coupling means between the detector and shorting means 83 of Fig. 10. The position of probe 12 along the line should be such as to provide a suitable deflection of the meter connected to terminal 62 with minimum coupling between the probe and the line. After the proper position of the probe has been determined the slot 5 on either side of block 6 is closed by slot covers 11 (Fig. 3) to preserve the uniformity of the line.

The impedance to be measured is connected between the center and outer conductors at end 9 of the transmission line. The plunger is then adjusted by hand wheels 25 and 29 until the meter connected to terminal 62 shows a maximum reading. The value of $L_r$ may then be read from scale 75. To determine $w$ the gage 63 is used in the manner already described to accurately measure the distance between the two points at which the indicating meter reads values of current equal to the maximum reading obtained at $L_r$ divided by $Q$ (Fig. 11). The measured distance between these two points is the value of $w$. To determine $\lambda$ the values of $L_r$ for two successive maxima are noted on scale 75 and twice the distance between these two points is taken as $\lambda$. These values of $w$, $L_r$ and $\lambda$ may be substituted in Equations 2 and 3 to determine $k$ which may be used in Equation 1 to evaluate Z as described in connection with Fig. 10. If $|k_d|$ and $\theta_d$ in Equations 2 and 3 are not known they may be determined by short-circuiting end 9 of the line and determining $L_r$ and $w$ as above for this condition. Substitution of these values of $w$ and $L_r$ in Equations 2 and 3, in which $|k| = 1$ and $\theta = 0$ for the short-circuited condition, gives the values of $|k_d|$ and $\theta_d$, as explained in connection with Fig. 10. As previously stated it is not necessary to recompute $|k_d|$ and $\theta_d$ unless the electrical characteristics of the transmission line and the associated detector circuit or the frequency is changed.

There are some instances in which it is advantageous to make measurements by the standing-wave method, and, as has been stated, the line of Fig. 1, although primarily intended for use in accordance with the resonant-current method, may also be used in accordance with the standing-wave method. When used in this way the equivalent circuit of the line is as shown in Fig. 12. In this figure 80' and 81' represent the two conductors of a transmission line which is excited at one end by a generator 90 having a generated voltage $E_g$ and an internal impedance $Z_g$. The impedance Z to be measured is connected across the other end of the line between points $a'$ and $b'$. A voltmeter 91, having such high internal impedance that its presence across the line has no appreciable effect on the line, is arranged to be moved along the line to measure the voltage at various distances from the load end. As the voltmeter is moved along the line the voltage varies between maxima and minima as shown in Fig. 13 and if the attenuation in the line is negligible, the distance between successive maxima or minima is one-half the wavelength of the energy in the line.

The impedance Z under measurement may be obtained from the following relations:

$$(4) \quad Z = Z_0 \frac{1-k}{1+k}$$

$$(5) \quad k = |k| \cos\theta + j\,|k| \sin\theta$$

$$(6) \quad k = \frac{\frac{E_{max}}{E_{min}} - 1}{\frac{E_{max}}{E_{min}} + 1}$$

$$(7) \quad \theta = \frac{4\pi}{\lambda} U_{min} \pm 2n\pi \; (n=0,1,2,3,\ldots)$$

in which

Z = impedance to be measured
$Z_0$ = characteristic impedance of measuring line
$k$ = complex reflection coefficient associated with Z
$|k|$ = magnitude of $k$
$\theta$ = phase angle of $k$
$E_{max}$ = maximum voltage on line
$E_{min}$ = minimum voltage on line
$U_{min}$ = distance from load end of line to a voltage minimum $E_{max}$, $E_{min}$, $U_{min}$ and $\lambda$ may be determined by measurements made on the line using travelling voltmeter 91.

In using the line shown in Fig. 1 in accordance with the standing-wave method a signal generator is connected in place of the detector in housing 55 so that energy is fed through the impedance matching network 47—58—46 to transmission line 36 in housing 44, and thence through transmission line 36 to loop 33 in the face of plunger 20 (Figs. 4 and 6) which serves to energize transmission line 2. That part of transmission line 2 within block 4 corresponds to the transmission line of Fig. 12 so that, in this case, that part of transmission line 2 external to block 4 merely serves to convey energy to that part inside block 4. Therefore looking to the right into transmission line 2 at its point of entry into block 4 there appears a voltage $Eg$ and an impedance $Zg$ as in Fig. 12. The impedance to be measured is connected across the transmission line at end 9.

The block 6 carrying the probe is replaced by the arrangement shown in Fig. 14 for standing-wave measurements. Referring to this figure, block 6' carries a probe 12' which extends through slot 5 into transmission line 2. The block 6' moves along block 4 as does block 6 in Fig. 1 and also carries a pointer so that the distance of the probe 12' from the end 9 of the line may be determined from scale 8 (Fig. 1). The block 6' also carries a detector for producing a direct current voltage from the high frequency energy picked up by probe 12'. The detector may be of any suitable high frequency type and its details are not a part of the invention. One suitable type of detector is shown in Fig. 14 and consists of a crystal 100 electrically connected to the probe 12' and mounted in a threaded base 101 by means of insulator 102 which also supports probe 12'. A bracket 103 also electrically connected to the crystal and supported by insulator 102 serves to support the central conductor 104 of a concentric tuning line the outer conductor of which is formed by the tube 105. A "cat-whisker" 106 is electrically connected to base 101 and contacts the surface of crystal 100. The tuning line is adjusted to near a quarter wavelength at the operating frequency by means of adjustable shorting means 109 and together with the capacity 107 between the outer conductor 105 and the base 101 forms a low pass filter between the crystal and meter 108 which allows the direct current or audio frequency output of the detector but not the high frequency current to reach D. C. or audio frequency meter 108. Threading of the base 101 into block 6' permits adjustment of the amount of probe 12' extending into transmission line 2. It will be noted that block 6' does not have a tongue to fit slot 5 as does block 6 (Fig. 2). Also slot covers such as shown at 11 in Fig. 3 are not used in this application of the line.

With the detector and indicator arrangement replacing block 6 in Fig. 1 the impedance to be measured is connected across end 9 of line 2. With a constant excitation applied to the line, block 6' (Fig. 14) is adjusted along that part of the line within block 4 to determine $E_{max}$, $E_{min}$, $U_{min}$ and $\lambda$, the latter two measurements being made on scale 8. After these values have been determined the unknown impedance may be evaluated using Equations 4 through 7 as already explained.

I claim as my invention:

1. In an impedance measuring device a high frequency shielded transmission line, said line having an exposed end to which an impedance to be measured may be connected, a slot in said shield extending from said exposed end to an intermediate point on said line, means for positioning a first electrical coupling device through said slot into the interior of said shield and for moving said coupling device to any position along said slot, means for short-circuiting the conductors of said line, said short circuiting means being adjustable over the unslotted portion of said line whereby the length of said line between said exposed end and said short-circuiting means may be varied, means for accurately measuring the length of said line between said exposed end and said short-circuiting means and means for accurately measuring small changes in said length, a second electrical coupling device mounted on said short-circuiting means and movable therewith, and means for connecting each of said coupling devices to an external circuit.

2. An impedance measuring device comprising a concentric transmission line having a length several times the wavelength of the frequency at which measurements are to be made, said line having an exposed end to which an impedance to be measured may be connected, a slot in the outer conductor of said transmission line extending from said exposed end to an intermediate point on said line, means for positioning a first electrical coupling device through said slot into the interior of said line and for moving said first coupling device to any position along said slot, means adjustable over the unslotted portion of said line for short-circuiting the inner conductor to the outer conductor of said concentric transmission line, said short-circuiting means comprising a cylindrical plunger made of highly conductive material and having a central cylindrical passageway for the center conductor of said concentric transmission line, the inner end of said plunger having a plane face perpendicular to the longitudinal axis of the plunger, means making good electrical contact between the plunger and the inner surface of the outer conductor and the outer surface of the inner conductor of said concentric transmission line, an electrical coupling loop mounted on said plane face of the inner end of said plunger, an additional longitudinal passageway in said plunger, a transmission line connected to said loop and extending through said additional passageway past the outer end of said plunger, a carriage movable relative to said concentric transmission line, means for supporting the outer end of said plunger on said carriage, a rectifying device and an impedance matching means mounted on said carriage, said impedance matching means being connected between said detector and the transmission line associated with said coupling loop, means for connecting a source of high frequency energy to said first coupling device, means for connecting a direct current or audio frequency indicating device to said detector, means for moving said carriage relative to said concentric transmission line, means for accurately measuring the length of said transmission line between said exposed end and said short-circuiting means and means for accurately measuring small changes in said length.

MING S. WONG.

REFERENCES CITED

The following references are of record in the file of this patent:

UNITED STATES PATENTS

| Number | Name | Date |
|---|---|---|
| 2,358,462 | Mahren | Sept. 19, 1944 |
| 2,379,047 | Thomas | June 26, 1945 |
| 2,404,797 | Hansen | July 30, 1946 |
| 2,428,287 | Linder | Sept. 30, 1947 |
| 2,438,932 | Mahren | Apr. 6, 1948 |

OTHER REFERENCES

Meagher et al.: Practical Analysis of Ultra High Frequency, R. C. A. Service Co., Inc., 2nd edition, August 1943, page 20.

Proceedings of the I. R. E., vol. 33, No. 9, September 1945; pages 609–619.